United States Patent
Brisciani

(10) Patent No.: US 8,348,493 B2
(45) Date of Patent: Jan. 8, 2013

(54) ELECTRONIC MANAGER FOR BREAD DOUGH MIXERS AND OPERATING METHOD

(76) Inventor: Roberto Brisciani, Valencia (ES)

( * ) Notice: Subject to any disclaimer, the term of this patent is extended or adjusted under 35 U.S.C. 154(b) by 902 days.

(21) Appl. No.: 11/989,615

(22) PCT Filed: May 24, 2006

(86) PCT No.: PCT/ES2006/000290
§ 371 (c)(1),
(2), (4) Date: Jul. 29, 2008

(87) PCT Pub. No.: WO2007/017530
PCT Pub. Date: Feb. 15, 2007

(65) Prior Publication Data
US 2009/0257304 A1 Oct. 15, 2009

(30) Foreign Application Priority Data

Jul. 29, 2005 (ES) .................................. 200501868

(51) Int. Cl.
*B01F 15/02* (2006.01)
(52) U.S. Cl. ....................... 366/142; 366/182.4; 366/601
(58) Field of Classification Search .................. 366/142, 366/182.4, 206, 601
See application file for complete search history.

(56) References Cited

U.S. PATENT DOCUMENTS

| | | |
|---|---|---|
| 4,766,766 A | 8/1988 | Ahlert et al. |
| 2004/0120215 A1* | 6/2004 | Huang et al. ................. 366/203 |

FOREIGN PATENT DOCUMENTS

| | | |
|---|---|---|
| CN | 87 2 01634 | 2/1988 |
| DE | 1 532976 | 3/1970 |
| EP | 0 246 768 | 11/1987 |
| EP | 1 433 382 | 6/2004 |
| ES | 2 038 967 | 8/1993 |
| FR | 2 676 619 | 11/1992 |
| GB | 2 029 049 | 3/1980 |
| JP | 2004-135540 | 5/2004 |
| JP | 2005-505291 | 2/2005 |

OTHER PUBLICATIONS

International Search Report issued Oct. 26, 2006 in the International (PCT) Application of which the present application is the U.S. National Stage.
Extended European Search Report issued Oct. 19, 2010 in European Application No. 06 75 5373.

* cited by examiner

*Primary Examiner* — David Sorkin
(74) *Attorney, Agent, or Firm* — Wenderoth, Lind & Ponack, L.L.P.

(57) ABSTRACT

The invention relates to an electronic manager for bread dough mixers and to an operating method. The invention consists of an integral module (15) comprising a PLC (2) which, by means of relays (3, 4 and 5), controls a low-speed contact (8), a high-speed contact (9) and an electrovalve (10, 10') in order to operate a mixer (14). In addition, the PLC (2) controls a temperature sensor (6), a flowmeter (7, 7') and a visual and audible indicator (13). The corresponding method comprises a parameter definition step, a start confirmation step, an oxygenation step, a liquid metering step, a mixing step and a return-to-rest step.

4 Claims, 2 Drawing Sheets

ELECTRONIC MANAGER FOR BREAD DOUGH MIXERS AND OPERATING METHOD

OBJECT OF THE INVENTION

As stated in the title of this descriptive specification, the present invention relates to an electronic manager for bread dough mixers and operating method, the aim of which is to provide automatic equipment suitable for products of pizza manufacturers, confectioners and bakers, which will permit products of constant quality to be obtained quickly, simply and without qualified personnel, being especially suited to the obtaining of pizza dough starting from a special mixture which simply requires the addition of water and mixing by means of the inventive equipment.

PRIOR ART OF THE INVENTION

Industrial processes for obtaining dough in the sector of pizza manufacture, confectionery and bakery need high control over the parameters, requiring qualified personnel and very often without achieving a constant quality of the final product, with the corresponding product very often requiring a preparation that is almost by hand.

Moreover, bread dough mixing machines are known which basically consist of a vat on which the different mixing elements act and which only accept two speed levels, fast and slow, with one operating time in each of these speeds.

In order to overcome the drawbacks inherent to these mixing machines, machines have been conceived which permit certain functions of the mixing to be automated. So, patent application EP-A-1433382 describes and illustrates a variable speed mixing device and its control system. Changes are produced in the speed by means of the control system while the apparatus is functioning, with a controlled acceleration and deceleration. It furthermore includes a support for the bowl which can be raised and dropped by means of a mechanism. There is also patent application EP-A-0246768, apparatus for mixing or kneading dough, which includes a mixing chamber, a hopper for the inlet of flour, a stirrer, an air inlet and outlet, and a water inlet, this apparatus being governed by a controller which, via a series of predetermined parameters, opens a series of valves and operates the mixing tool. Finally, patent application GB-A-20298049 describes and illustrates an electric mixing and kneading machine which functions at variable speeds, with an electronic control system, with different speeds being able to be programmed during defined periods of time, and the whole assembly being able to be controlled from a central processor. Nevertheless, none of these devices of the state of the art permits fully automated management of the flow and inlet of water into the mixing vat.

DESCRIPTION OF THE INVENTION

In order to achieve the objectives and avoid the drawbacks stated in the previous section, the invention consists of an electronic manager for bread dough mixers and operating method.

As a novelty, according to the invention, the electronic manager thereof comprises an integral module structured around a programmable logic controller (PLC) provided with push-buttons for the introduction of orders and a screen for displaying the operating conditions, the integral module including respective relays for actuating the said high and low speed contacts, together with another relay for actuating an electrovalve and a power supply source that feeds the relays and the PLC, the PLC being connected to a temperature sensor, to a flowmeter and to an indicator light with audible buzzer, as well as to the said relays.

In addition, the electronic manager can include an external programmer device connected to the integral module which determines its operation. Moreover, the flowmeter and the electrovalve of the corresponding water duct can be integrated into a water metering module in the mixer and controlled by the integral module via an electrical output from the flowmeter and an electrical output from the electrovalve; said flowmeter presenting a water inlet and the electrovalve presenting a water outlet towards the vat of the mixer.

So a first object of the present invention is a bread dough mixer where the mixer includes connectors for selecting the speed and for starting it up. The bread dough mixer comprises an electronic manager which in turn comprises an integral module (15) managed by a programmable logic controller (PLC). The PLC, which is integrated in the integral module (15), is provided with push-buttons for the introduction of orders and a screen for displaying the operating conditions. In turn, the integral module includes respective relays for actuating certain high and low speed contacts, together with another relay for actuating an electrovalve and a power supply source that feeds the relays and the PLC. The PLC is connected to a temperature sensor, to a flowmeter and to an indicator light with audible buzzer, as well as to the said relays.

In addition, the mixer comprises a water metering module integrated into the mixer and controlled by the integral module and comprises an external programmer device connected to the integral module which determines the actuation of the integral module. The water metering module comprises:
  a water duct;
  the flowmeter and the electrovalve which in turn are integrated in the water duct, the flowmeter and the electrovalve controlling the amount and velocity of the water which is introduced into the vat of the mixer through the water duct, the flowmeter having a water inlet and the electrovalve having a water outlet towards the vat of the mixer;
  two electrical connections which connect the integral module with the flowmeter and the electrovalve respectively for the management of the flowmeter and the electrovalve.

The integral module structured around the PLC, the connection of the integral module with the external programmer and the integration of the water metering means result in the automatization of the process of obtaining of a final product, mainly obtaining bread dough.

With the equipment defined above, an operating method is provided that includes:
  A first step of defining the parameters: oxygenation time, volume of liquid or water, regulation of the flow of that liquid or water, time taken by the mixer to perform a complete turn, waiting time between turns.
  A second step of confirmation of the start of the process.
  A third step of oxygenation during which the preweighed mixture that is going to form part of the final product together with the water is oxygenated.
  A fourth step of metering the water, in which water is allowed to pass at the stated speed and quantity, according to the final product to be achieved.
  A fifth step of mixing, with the actual mixing process being performed in this step since during the earlier steps the mixer has been rotating dry, in such a way that in this step the mixing and homogenisation of the flour and liquid take place, according to the time and speed of rotation previously set by the user.

And a sixth step of turns-rest, in which a rest time is allowed, established by the user, along with some complete turns of the mixing vat, preferably at low speed and at intervals as set by the user. This helps to improve the plastic and/or viscosity characteristics of the dough With the equipment and method described, the advantages are provided that the creation process of dough for confectionary, bakery and pizza making can be automated without any need for specialised operators and with a high degree of homogeneity in the final results of the product obtained.

Below, in order to facilitate a better understanding of this specification and forming an integral part thereof, some figures are attached in which, on an illustrative rather than limiting basis, the most characteristic details of the invention have been represented.

DESCRIPTION OF AN EXAMPLE OF EMBODIMENT OF THE INVENTION

A description is going to be made forthwith of an example of the invention making reference to the numbering adopted in the figures.

So, the electronic manager for bread dough mixers of the present example consists of an integral module 15 comprising a programmable logic controller (PLC) 2, the data gathering terminals of which are connected to a temperature sensor 6 and a flowmeter 7, in such a manner that the sensor 6 is in contact with the surroundings, while the flowmeter 7 controls the inlet of water into the vat of a mixer 14.

Figure 1:
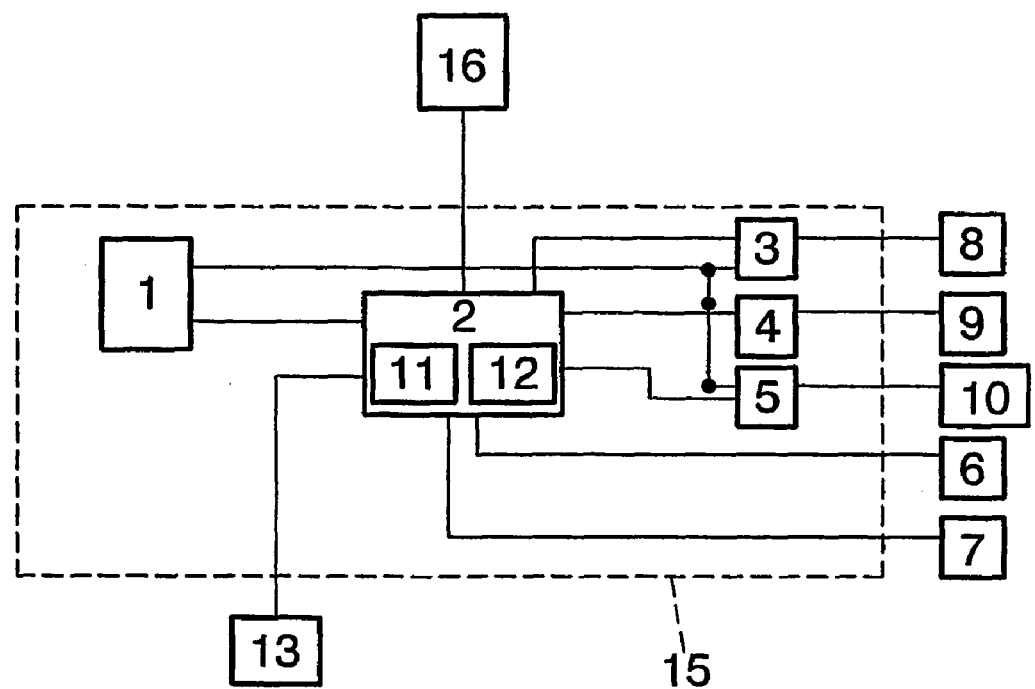
FIG. 1. Represents a block diagram of an electronic manager for mixers embodied according to the present invention.
Figure 2:
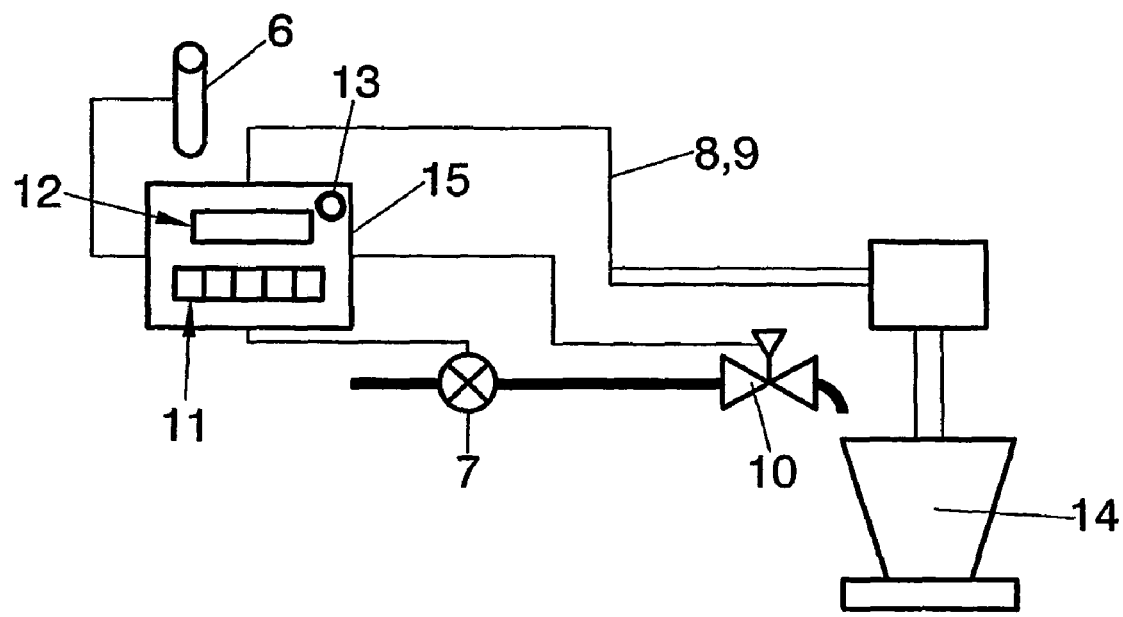
FIG. 2. Schematically represents the application of the electronic manager of FIG. 1 above to a mixer.
Figure 3:
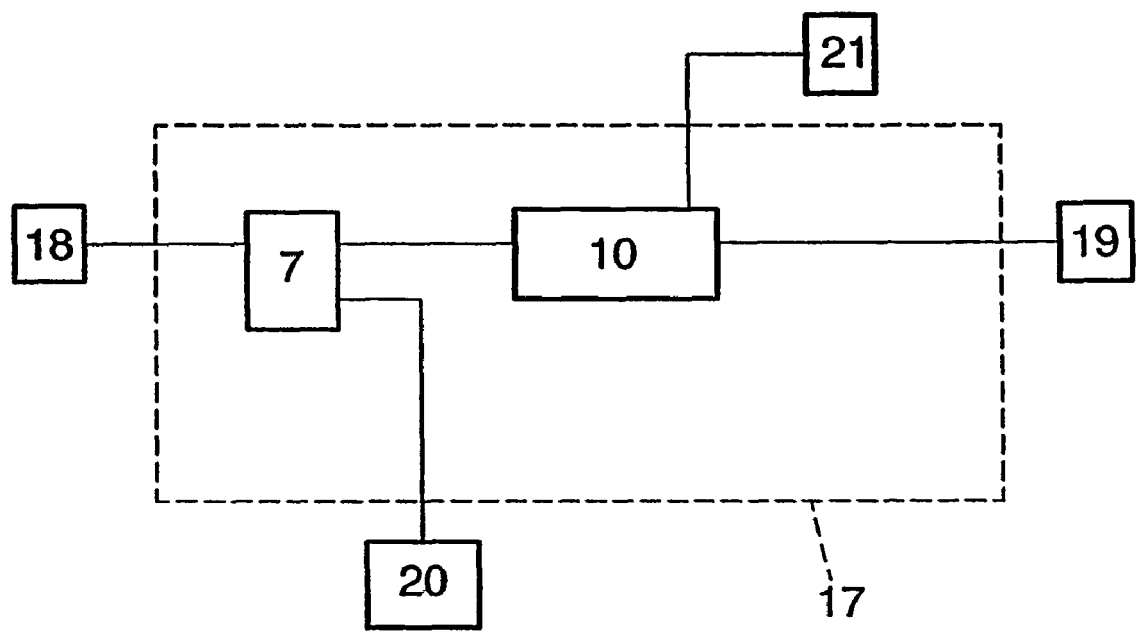
FIG. 3. Represents a block diagram of a water metering module integrated into a mixer and controllable by means of the inventive electronic manager.

The actuation contact for the mixer motor at low speed 8 and the actuation contact for the mixer motor at high speed 9 are connected to the external terminals of the corresponding actuation relays 3 and 4, which are controlled by the PLC 2 and fed by a power supply source 1 connected to the electrical mains. A third relay 5 controlled by the PLC 2 is connected via the corresponding terminals to an electrovalve 10 which permits the inlet of water into the vat of the mixer 14. So, the PLC 2 is connected to the mixer 14 via the contacts 8 and 9. The PLC 2 is integrated into a control panel for handling which presents certain push-buttons 11 for the introduction of orders and a screen 12 for displaying the operating conditions. Moreover, the PLC 2 to be found in the integral module 15 is suitable for being connected to a programmer 16 which determines its actuation. Furthermore, the flowmeter 7' and the electrovalve 10' of the corresponding water duct can be integrated into a water metering module 17 integrated into the mixer and controlled by the integral module 15 via an electrical output 20 from the flowmeter 7' and an electrical output 21 from the electrovalve 10'; said flowmeter 7' presenting a water inlet 18 and the electrovalve 10' presenting a water outlet 19 towards the vat of the mixer; as represented in FIG. 3. Finally, the PLC 2 is connected by means of an output terminal to an indicator light with audible buzzer 13 on which it can be actuated in order to activate it.

The electronic manager of this example permits an operating method having the following steps:

A first step of defining the parameters: oxygenation time, volume of liquid or water, regulation of the flow of the liquid or water, time taken by the mixer to perform a complete turn, waiting time between turns.

A second step of confirmation of the start of the process.

A third step of oxygenation during which the preweighed mixture that is going to form part of the final product together with the water is oxygenated.

A fourth step of metering the water, in which water is allowed to pass at the stated speed and quantity, according to the final product to be achieved.

A fifth step of mixing, with the actual mixing process being performed in this step since during the earlier steps the mixer has been rotating dry, in such a way that in this step the mixing and homogenisation of the flour and liquid take place, according to the time and speed of rotation previously set by the user.

And a sixth step of turns-rest, in which a rest time is allowed, established by the user, along with some complete turns of the mixing vat, preferably at low speed and at intervals as set by the user. This helps to improve the plastic and/or viscosity characteristics of the dough.

The invention claimed is:

1. A bread dough mixer where the mixer includes connectors for selecting a speed and for starting the mixer, comprising:

an electronic manager which in turn comprises an integral module, the integral module comprising a programmable logic controller (PLC) for managing the integral module, the PLC being provided with push-buttons for the introduction of orders and a screen for displaying operating conditions, the integral module including first and second relays for respectively actuating certain high and low speed contacts, together with a third relay for actuating an electrovalve and a power supply source that feeds the relays and the PLC, the PLC being connected to a temperature sensor, to a flowmeter and to an indicator light with audible buzzer, as well as to the relays, wherein the mixer further comprises a water metering module which is controlled by the integral module for the automatization of a process of obtaining a final product, wherein the water metering module comprises
a water duct,
the flowmeter and the electrovalve which in turn are integrated in the water duct so as to control an amount and velocity of water which is introduced into a vat of the mixer through the water duct, the flowmeter having a water inlet and the electrovalve having a water outlet toward the vat of the mixer, and
two electrical connections which connect the integral module with the flowmeter and the electrovalve, respectively, for the management of the flowmeter and the electrovalve.

2. Method of operating the bread dough mixer defined in claim 1, the method comprising:
defining the parameters: oxygenation time, volume of liquid or water, regulation of the flow of the liquid or water, time taken by the mixer to perform a complete turn, waiting time between turns;
confirming the start of the process;
oxygenating the preweighed mixture that is going to form part of the final product together with the water;
metering the water, in which water is allowed to pass at the stated speed and quantity, by means of the flowmeter and the electrovalve of the water duct which are integrated into the water metering module integrated into the mixer and controlled by the integral module via an electrical output from the flowmeter and an electrical output from the electrovalve, said flowmeter presenting a water inlet and the electrovalve presenting a water outlet towards the vat of the mixer, according to the final product to be achieved; and mixing, with the actual mixing process being performed in this step since during the earlier steps the mixer has been rotating dry, in such a way that in this step the mixing and homogenisation of the flour and liquid take place, according to the time and speed of rotation previously set by the user.

3. The method of operating the bread dough mixer according to claim 2, further comprising:

performing turns-rest, in which a rest time is allowed, established by the user, along with some complete turns of the mixing vat, preferably at low speed and at intervals as set by the user; all this in order to improve the plastic and/or viscosity characteristics of the dough.

4. The bread dough mixer according to claim 1, further comprising:

an external programmer device connected to the integral module which determines the actuation of the integral module.

* * * * *